United States Patent [19]

Boissier et al.

[11] 3,742,070

[45] June 26, 1973

[54] SUBSTITUTED 9,10-DIHYDRO - 9,10-ETHANO -9-ANTHROLS AND PROCESS FOR PREPARATION

[75] Inventors: Jacques Robert Boissier, Paris; Roger Ratouis, Saint Cloud, both of France

[73] Assignee: Societe Anonyme dite Societe Industrielle pour la Fabrication des Antibrotigues (S.I.F.A), Puteaux, France

[22] Filed: Sept. 8, 1970

[21] Appl. No.: 70,229

Related U.S. Application Data

[63] Continuation of Ser. No. 639,012, May 17, 1967, abandoned.

[52] U.S. Cl..... 260/618 F, 260/488 CD, 260/612 R
[51] Int. Cl............................................ C07c 35/22
[58] Field of Search................................ 260/618 F

[56] References Cited
OTHER PUBLICATIONS

Meek et al., "Helv. Chem. Acta" Vol. XL, Fasc. VII pp. 2,129–2,138 (1957).

*Primary Examiner*—Leon Zitver
*Assistant Examiner*—Norman Morgenstern
*Attorney*—Davis, Hoxie, Faithfull & Hapgood

[57] ABSTRACT

The compounds are new substituted 9,10-dihydro -9,10-ethano -9-anthrols of formula:

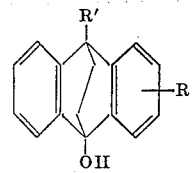

R - R': hydrogen, fluorine, chlorine or bromine atoms, lower alkyl or alkoxy or trifluoromethyl radicals, (at least one of the substituents R or R' not being a hydrogen atom)

They are extremely useful intermediates for the preparation of new pharmacologically active products. The compounds are prepared by the reaction of a substitued anthrone of formula

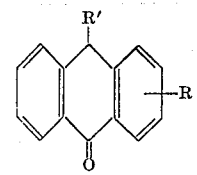

or of any easily hydrolysable ester of said anthrone, with ethylene under pressure, while heating in a solvent, and then possibly hydrolysis of the ester.

5 Claims, No Drawings

SUBSTITUTED 9,10-DIHYDRO - 9,10-ETHANO -9-ANTHROLS AND PROCESS FOR PREPARATION

This application is a continuation of application Ser. No. 639,012, filed May 17, 1967, now abandoned.

This invention relates to new substituted 9,10-dihydro-9,10-ethano -9-anthrols of general formula:

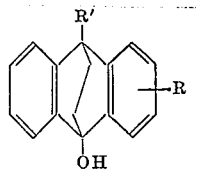

in which R and R', which may be identical or different, represent hydrogen, fluorine, chlorine or bromine atoms or lower alkyl, lower alkoxy or trifluoromethyl radicals, (at least one of the substituents R or R' not being a hydrogen atom).

Lower alkyl or lower alkoxy radicals mean containing from one to five carbon atoms.

This invention relates also to the process for preparing products corresponding to the above formula 1. This process comprises reacting a substituted anthrone of formula

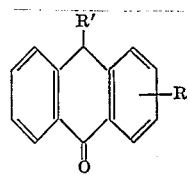

in which R and R' have the meaning indicated above, or an easily hydrolysable ester of said anthrone, with ethylene under pressure, while heating in a solvent and, at the completion of the reaction:
either, if a substituted anthrone of formula 2 is used as starting product, isolating the product of formula 1 obtained;
or, if a substituted anthrone ester is used as starting product, hydrolysing by usual means, the ester of the substituted 9,10-dihydro -9,10-ethano -9-anthrol thus formed after the reaction of ethylene, then isolating the product of formula 1 obtained.

In a preferred method of carrying out the process, said method not limiting the invention, the following procedure is used:
a. the reaction is performed under a pressure of ethylene grater than 30 kg/cm² and advantageously between 30 kg/cm² and 200 kg/cm².
b. the condensation of ethylene with the anthrone of formula 2 or with its ester is carried out between 150° C and 250° C preferably; it is also desirable to let in contact the products during several hours, 10 to 60 hours for instance, as the reaction is rather slow; for the same ground, it is preferable to operate with stirring.
c. the starting products are used in a solvent which is an aromatic hydrocarbon. When the starting anthrone of formula 2 bears as substituents one or several lower alkyl, lower alkoxy or trifluoromethyl radicals, it is also possible to use as solvents pyridinoid bases such as, for example pyridine or picoline.
d. when the starting product is a substituted anthrone of formula 2, the product obtained after the reaction with ethylene, can be isolated by removal of the solvent, then purified by usual means, for instance, by recrystallization.

e. the final necessary hydrolysis is effected, when the ester of a substituted anthrone is used as starting product, by means known per se such as, for instance, action of a base such as sodium or potassium hydroxyde, in an aqueous or hydroethanolic medium, preferably at the boiling temperature of the reaction medium; at the completion of the hydrolysis, the desired product is isolated, for instance, by precipitation and filtration.

The new substituted 9,10-dihydro -9,10-ethano -9-anthrols, according to the invention are extremely useful intermediates for the preparation of new pharmacologically active products; therefore, they are valuable substances for obtaining new medicaments which can be used in human therapeutics. So, for instance, reacting 2-dimethylamino chlorethane hydrochloride with 2-methyl -9,10-dihydro -9,10-ethano -9-anthrol in the presence of sodium hydroxide in benzene, there were obtained 9-(2-dimethylaminoethoxy)-2-methyl -9,10-dihydro-9,10-ethanoanthracene and by salification with hydrochloric acid, the corresponding hydrochloride (compound I). In the same way, starting from 4-chloro -9,10-dihydro -9,10-ethano -9-anthrol, there were obtained 4-chloro -9-(2-dimethylaminoethoxy) -9,10-dihydro -9,10-ethanoanthracene and its hydrochloride (compound II) and starting from 10-methyl -9,10-dihydro -9,10-ethano -9-anthrol, there were obtained 9-(2-dimethylaminoethoxy)-10-methyl -9,10-dihydro -9,10-ethanoanthracene and its hydrochloride (compound III).

Compounds I, II and III are proved to be very useful in human therapeutics because of their remarkable pharmacological properties, namely as antihistaminics and local anesthetics. Their investigation has permitted to obtain the following results:
a. Lethal doses 50 determined by intraperitoneal route in mice were respectively 168 mg/kg for compound I, 161 mg/kg for compound II and 209 mg/kg for compound III.
b. Average concentrations (I.C.50) required to produce a 50 percent inhibition on guinea-pig isolated ileum, according to Magnus' technique and expressing the antagonistic action of the compounds against the contracturing action of histamine were respectively $5.10^{-8}$ for compound I, $2.10^{-7}$ for compound II and $10^{-8}$ for compound III.
c. The number of unitary lethal doses of histamine antagonized in guinea-pigs by subcutaneous administration of 20 mg/kg of compounds I, II or III, were respectively 600 for compound I, 1,000 for compound II and 600 for compound III; the unitary lethal dose of histamine used in the experimentation was 0.8 mg/kg of histamine dihydrochloride, administered by intravenous route, 30 minutes after the tested compound. The number of unitary lethal doses of histamine antagonized by a compound showed the considerable histaminic activity in vivo.
d. The sums of the numbers of stimulations showing the local anesthetic activity upon rabbit cornea, according to Regnier's technique (C.R. de l'Acad. Sc. Paris, 1923 — 177 — 558) were respectively 128 for compound I, 149 for compound II and 537 for compound III. A 1% solution of each tested compound was used. The said numbers were the numbers of stimulations, necessary to induce oculo-palpebral reflex, 3 minutes, 6 minutes, 10 minutes, then every 5 minutes, after the instillation, the total experiment lasting 1 hour.

The following examples, given as non limiting examples, illustrate the invention.

EXAMPLE 1  2-methyl -9,10-dihydro -9,10-ethano -9-anthrol.

A solution of 41.6 g (0.2 mole) of 2-methyl anthrone in 400 ml of pyridine was stirred for 48 hours in an autoclave at 200° – 210° C under a pressure of 60 kg of ethylene.

After cooling, pyridine was driven off by concentration in vacuo, the oily residue was taken up with benzene, the benzenic solution was washed with dilute hydrochloric acid and with water, benzene was driven off by concentration in vacuo. The solid residue was recrystallized from heptane in the presence of decolorizing carbon to give 37.3 g (79 percent) of 2-methyl- 9,10-dihydro -9,10-ethano -9-anthrol as white crystals. Melting Point : 143° – 144° C on a heating stage microscope.

Analysis : $C_{17} H_{16} O$

|  | C | H |
|---|---|---|
| Caclulated % | 86.4 | 6.8 |
| Found % | 86.4 | 6.7 |

EXAMPLE 2  2-methoxy -9,10-dihydro -9,10-ethano -9-anthrol.

Using the process described in Example 1, but starting from 44.8 g (0.2 mole) of 2-methoxy anthrone, there were obtained 37.2 g (74 percent) of 2-methoxy -9,10-dihydro -9,10-ethano-9-anthrol as white crystals, after recrystallization from a mixture of heptane and benzene. Melting Point : 142° – 143° C on a heating stage microscope.

Analysis : $C_{17} H_{16} O_2$

|  | C | H |
|---|---|---|
| Calculated % | 80.9 | 6.4 |
| Found % | 81.1 | 6.4 |

EXAMPLE 3  2-chloro -9,10-dihydro -9,10-ethano -9-anthrol.

A solution of 45.7 g (0.2 mole) of 2-chloro anthrone and of 0.5 g of tert.-butylcathecol in 500 ml of toluene was stirred for 48 hours, in an autoclave at 200° – 210° C under a pressure of 150 kg of ethylene. After cooling, toluene was driven off by concentration in vacuo and the solid residue was recrystallized several times from heptane in the presence of decolorizing carbon. There were obtained 25.2 g (49 percent) of 2-chloro -9,10-dihydro -9,10-ethano -9-anthrol as white crystals. Melting Point : 144° C on a heating stage microscope.

Analysis : $C_{16} H_{13} Cl O$

|  | C | H |
|---|---|---|
| Calculated % | 74.9 | 5.1 |
| Found % | 74.9 | 5.0 |

EXAMPLE 4  4-chloro -9,10-dihydro -9,10-ethano -9-anthrol.

Using the process described in Example 3, but starting from 45.7 g (0.2 mole) of 4-chloro anthrone and operating for 24 hours at 200° C under a pressure of 50 kg of ethylene, there were obtained 24.6 g (46 percent) of 4-chloro -9,10-dihydro -9,10-ethano -9-anthrol as white crystals, after recrystallization from a mixture of heptane and benzene in the presence of decolorizing carbon. Melting Point : 174° – 175° C on a heating stage microscope.

Analysis : $C_{16} H_{13} Cl O$

|  | C | H |
|---|---|---|
| Calculated % | 74.9 | 5.1 |
| Found % | 75.1 | 5.1 |

EXAMPLE 5  3-chloro -9,10-dihydro -9,10-ethano -9-anthrol.

Using the process described in Example 3, but starting from 45.7 g (0.2 mole) of 3-chloro anthrone and operating for 48 hours at 180° – 190° C under a pressure of 50 kg of ethylene, there were obtained 17.5 g (34 percent) of 3-chloro -9,10-ethano -9,10-dihydro -9-anthrol as cream coloured crystals, after recrystallization from a mixture of isopropanol and heptane. Melting Point : 130° – 135° C on a heating stage microscope.

EXAMPLE 6  3-chloro -9,10-dihydro -9,10-ethano -9-anthrol.

a.  9-acetoxy -3-chloro -9,10-dihydro -9,10-ethanoanthracene.

A solution of 54.1 g (0.2 mole) of 9-acetoxy -3-chloro anthracene and of 0.5 g of tert.-butylcatechol in 300 ml of toluene was stirred in an autoclave for 48 hours at 200° C under a pressure of 150 kg of ethylene. After cooling, toluene was driven off by concentration in vacuo. The solid residue was recrystallized from heptane in the presence of decolorizing carbon, to give 45 g (75 percent) of 9-acetoxy -3-chloro -9,10-dihydro -9,10-ethanoanthracene as white crystals. Melting Point : 122° C on a heating stage microscope.

Analysis : $C_{18} H_{15} Cl O_2$

|  | C | H |
|---|---|---|
| Calculated % | 72.4 | 5.1 |
| Found % | 72.6 | 5.1 | b.  3-chloro -9,10-dihydro -9,10-ethano -9-anthrol.

The solution of 29.85 g (0.1 mole) of the product obtained in the above paragraph (a) in 400 ml of N/2 ethanolic potassium hydroxide was boiled under reflux for 2 hours. After cooling, 1,000 ml of water were added, the formed precipitate was collected, washed with water and dried. Recrystallization from heptane yielded 22 g (86 percent) of 3-chloro -9,10-dihydro -9,10-ethano -9-anthrol. Melting Point : 138° – 139° C on a heating stage microscope.

Analysis : $C_{16} H_{13} Cl O$

|  | C | H |
|---|---|---|
| Calculated % | 74.9 | 5.1 |
| Found % | 75.0 | 5.2 |

EXAMPLE 7  1-chloro -9,10-dihydro -9,10-ethano -9-anthrol.

a.  9-acetoxy -1-chloro -9,10-dihydro -9,10-ethanoanthracene.

Using the process described in Example 6 (a), but starting from 54.1 g (0.2 mole) of 9-acetoxy -1-chloro anthracene and working up under a pressure of 90 kg of ethylene, there were obtained 20.2 g (34 percent) of 9-acetoxy -1-chloro -9,10-dihydro -9,10 -ethanoanthracene as white crystals, after recrystallization from heptane in the presence of decolorizing carbon. Melting Point : 109° C on a heating stage microscope.

Analysis : $C_{18} H_{15} Cl O_2$

|  | C | H |
|---|---|---|
| Calculated % | 72.4 | 5.1 |
| Found % | 72.4 | 5.0 | b.  1-chloro -9,10-dihydro -9,10-ethano -9-anthrol.

Using the process described in Example 6 (b), but starting from 29.85 g (0.1 mole) of the product obtained in the above paragraph (a), there were obtained 19.8 g (77 percent) of 1-chloro-9,10-dihydro -9,10-ethano -9-anthrol, after recrystallization from heptane. Melting Point : 180° C on a heating stage microscope.

Analysis : $C_{16}H_{13}ClO$

|  | C | H |
|---|---|---|
| Calculated % | 74.9 | 5.1 |
| Found % | 74.8 | 5.1 |

EXAMPLE 8    4-chloro -9,10-dihydro -9,10-ethano -9-anthrol.

a.    9-acetoxy -4-chloro -9,10-dihydro -9,10-ethanoanthracene.

Using the process described in Example 6 (a), but starting from 54.1 g (0.2 mole) of 9-acetoxy -4-chloro anthracene and working up under a pressure of 100 kg of ethylene, there were obtained 28.1 g (47 percent) of 9-acetoxy -4-chloro -9,10-dihydro -9,10 - ethanoanthracene as white crystals, after recrystallization from petroleum ether. Melting Point : 72° – 74° C on a heating stage microscope.

Analysis : $C_{18}H_{15}ClO_2$

|  | C | H |
|---|---|---|
| Calculated % | 72.4 | 5.1 |
| Found % | 72.3 | 5.3 | b.    4-chloro -9,10-dihydro -9,10-ethano -9-anthrol.

Using the process described in Example 6 (b), but starting from 29.85 g (0.1 mole) of the product obtained in the above paragraph (a), there were obtained 18.2 g (71 percent) of 4-chloro-9,10-dihydro -9,10-ethano -9-anthrol, after recrystallization from heptane. Melting Point : 176° – 178° C on a heating stage microscope.

Analysis : $C_{16}H_{13}ClO$

|  | C | H |
|---|---|---|
| Calculated % | 74.9 | 5.1 |
| Found % | 74.7 | 5.2 |

EXAMPLE 9    10-methyl -9,10-dihydro -9,10-ethano -9-anthrol.

A solution of 46.8 g (0.225 mole) of 10-methyl anthrone and of 0.4 g of tert.-butylcatechol in 300 ml of pyridine was stirred in an autoclave, for 48 hours, at 200° – 210° C, under a pressure of 130 kg of ethylene. After cooling pyridine was driven off by concentration in vacuo, the residue was taken up with benzene , the benzenic solution was washed with dilute hydrochloric acid and with water, and benzene was driven off by concentration in vacuo. The solid residue was twice recrystallized from a mixture of hexane (1,300 ml) and of benzene (100 ml) to give 32.8 g (62 percent) of 10-methyl -9,10-dihydro -9,10-ethano-9-anthrol as white crystals. Melting Point : 148° – 149° C on a heating stage microscope.

Analysis : $C_{17}H_{16}O$

|  | C | H |
|---|---|---|
| Calculated % | 86.4 | 6.8 |
| Found % | 86.1 | 6.8 |

EXAMPLE 10    9-(2-dimethylaminoethoxy)-2-methyl -9,10-dihydro-9,10-ethanoanthracene and hydrochloride.

a.    preparation of the base.

A suspension of 23.6 g (0.1 mole) of 2-methyl -9,10-dihydro-9,10-ethano -9-anthrol, of 14.4 g (0.1 mole) of 2-dimethylamino chlorethane hydrochloride and of 16 g (0.4 mole) of powdered sodium hydroxide in 200 ml of benzene was boiled under reflux for 8 hours. After cooling the mixture to 40° – 50° C, 14.4 g (0.1 mole) of 2-dimethylamino chlorethane hydrochloride were again added, and reflux and stirring were continued for 15 hours longer. After cooling, the inorganic salts were filtered and washed with benzene. The benzenic solutions were collected and concentrated, the residue was distilled to yield 27.3 g (89 percent) of 9-(2-dimethylaminoethoxy)-2-methyl -9,10-dihydro -9,10-ethanoanthracene (oil boiling at 172° – 176° C/0.2 mm Hg and which gave by solidifying white crystals). Melting Point of the crystals, after recrystallization from pentane : 53° – 55° C on a heating stage microscope.

Analysis : $C_{21}H_{25}NO$

|  | C | H |
|---|---|---|
| Calculated % | 82.0 | 8.2 |
| Found % | 82.2 | 8.3 | b.    Preparation of the hydrochloride

A solution of 0.05 mole of hydrochloric acid in absolute ethanol was added to 15.35 g (0.05 mole) of the above base in absolute ethanol. After cooling at 0° C, there were obtained 9-(2-dimethylaminoethoxy)-2-methyl -9,10-dihydro -9,10-ethanoanthracene hydrochloride as white crystals. Melting Point after recrystallization from ethanol : 213° – 214° C on a heating stage microscope.

Analysis : $C_{21}H_{26}ClNO$

|  | C | H |
|---|---|---|
| Calculated % | 73.3 | 7.6 |
| Found % | 73.5 | 7.6 |

EXAMPLE 11    4-chloro -9-(2-dimethylaminoethoxy) - 9,10-dihydro-9,10-ethanoanthracene and hydrochloride.

a.    Preparation of the base.

Using the process described in Example 10 (a), but starting from 25.7 g (0.1 mole) of 4-chloro -9,10-dihydro -9,10-ethano-9-anthrol, the concentration of the benzenic solutions resulting from the reaction yeilded an oil which slowly solidified. The crystals thus obtained were recrystallized from pentane. There were obtained 18.4 g (56 percent) of 4-chloro-9-(2-dimethylaminoethoxy)    -9,10-dihydro    -9,10-ethanoanthracene as cream coloured crystals. Melting Point : 60° C on a heating stage microscope.

Analysis : $C_{20}H_{22}ClNO$

|  | C | H |
|---|---|---|
| Calculated % | 73.3 | 6.8 |
| Found % | 73.3 | 6.8 | b.    Preparation of the hydrochloride

Using the process described in Example 10 (b), but starting from 16.4 g (0.05 mole) of the above base, there were obtained 15 g of 4-chloro-9-(2-dimethylaminoethoxy)-9,10-dihydro-9,10-ethanoanthracene hydrochloride as white crystals. Melting Point after recrystallization from isopropanol : 218° C on a heating stage microscope.

Analysis : $C_{20}H_{23}Cl_2NO$

|  | C | H |
|---|---|---|
| Calculated % | 65.9 | 6.4 |
| Found % | 65.7 | 6.3 |

EXAMPLE 12
099-(2-dimethylaminoethoxy)-10-methyl-9,10-dihydro-9,10-ethanoanthracene and hydrochloride.

a.    Preparation of the base.

Using the process described in Example 10 (a), but starting from 23.6 g (0.1 mole) of 10-methyl -9,10-dihydro -9,10-ethano-9-anthrol, there were obtained 27.6 g (90 percent) of 9-(2-dimethylaminoethoxy)-10-methyl -9,10-dihydro -9,10-ethanoanthracene as an oil boiling at 182° C under 0.5 mm Hg.

b. Preparation of the hydrochloride.

Using the process described in Example 10 (b), but starting from 15.35 g (0.05 mole) of the above base, there were obtained 15.4 g of 9-(2-dimethylaminoethoxy)-10-methyl -9,10-dihydro-9,10-ethanoanthracene hydrochloride as white crystals. Melting Point after recrystallization from ethanol: 231° – 233° C on a heating stage microscope.

Analysis: $C_{21}H_{26}ClNO$

|  | C | H |
|---|---|---|
| Calculated % | 73.3 | 7.6 |
| Found % | 73.5 | 7.5 |

We claim:

1. Chlorinated 9,10-dihydro-9,10-ethano-9-anthrols of the general formula:

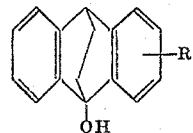

wherein R is chlorine.

2. The compound of claim 1, wherein R is chlorine at the 1-position.

3. The compound of claim 1, wherein R is chlorine at the 2-position.

4. The compound of claim 1, wherein R is chlorine at the 3-position.

5. The compound of claim 1, wherein R is chlorine at the 4-position.

* * * * *